Figure 1:
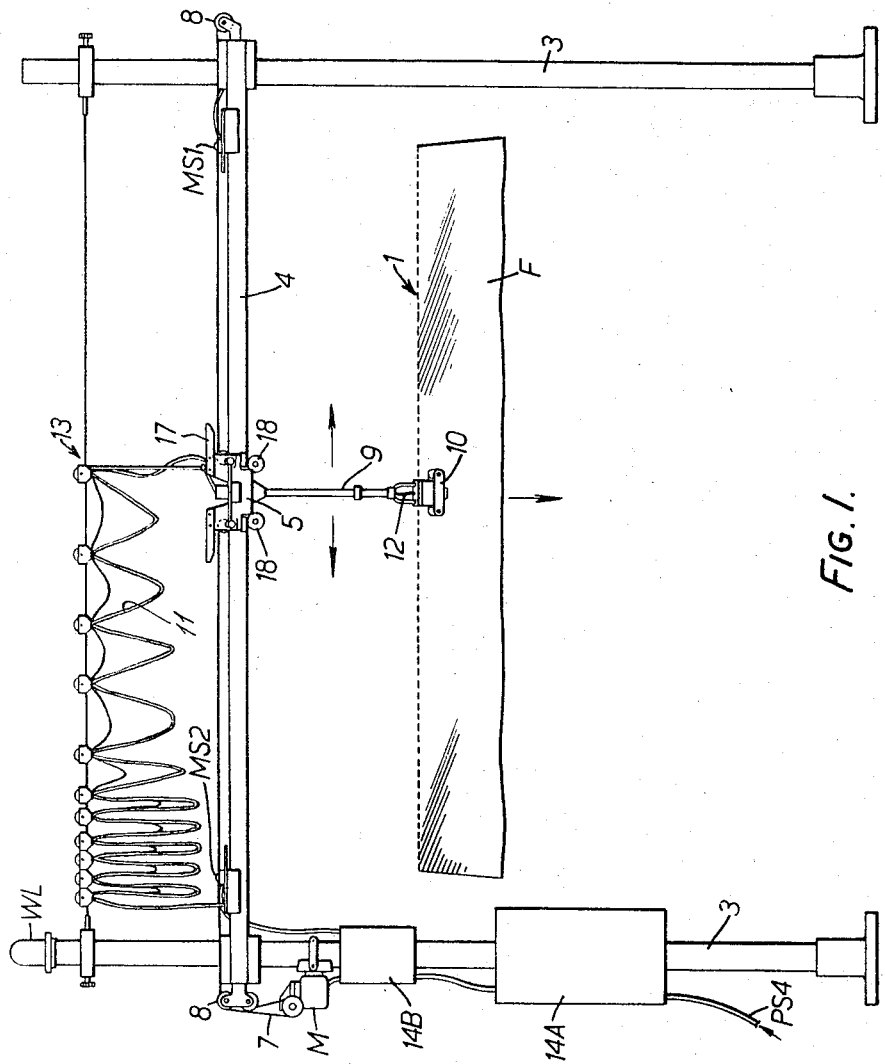

March 14, 1967    L. T. F. BRYAN    3,308,658
DEVICES FOR DETECTING FLAWS IN FABRICS
Filed March 10, 1964    5 Sheets-Sheet 1

INVENTOR
LEONARD THOMAS FRANK BRYAN
BY
ATTORNEY

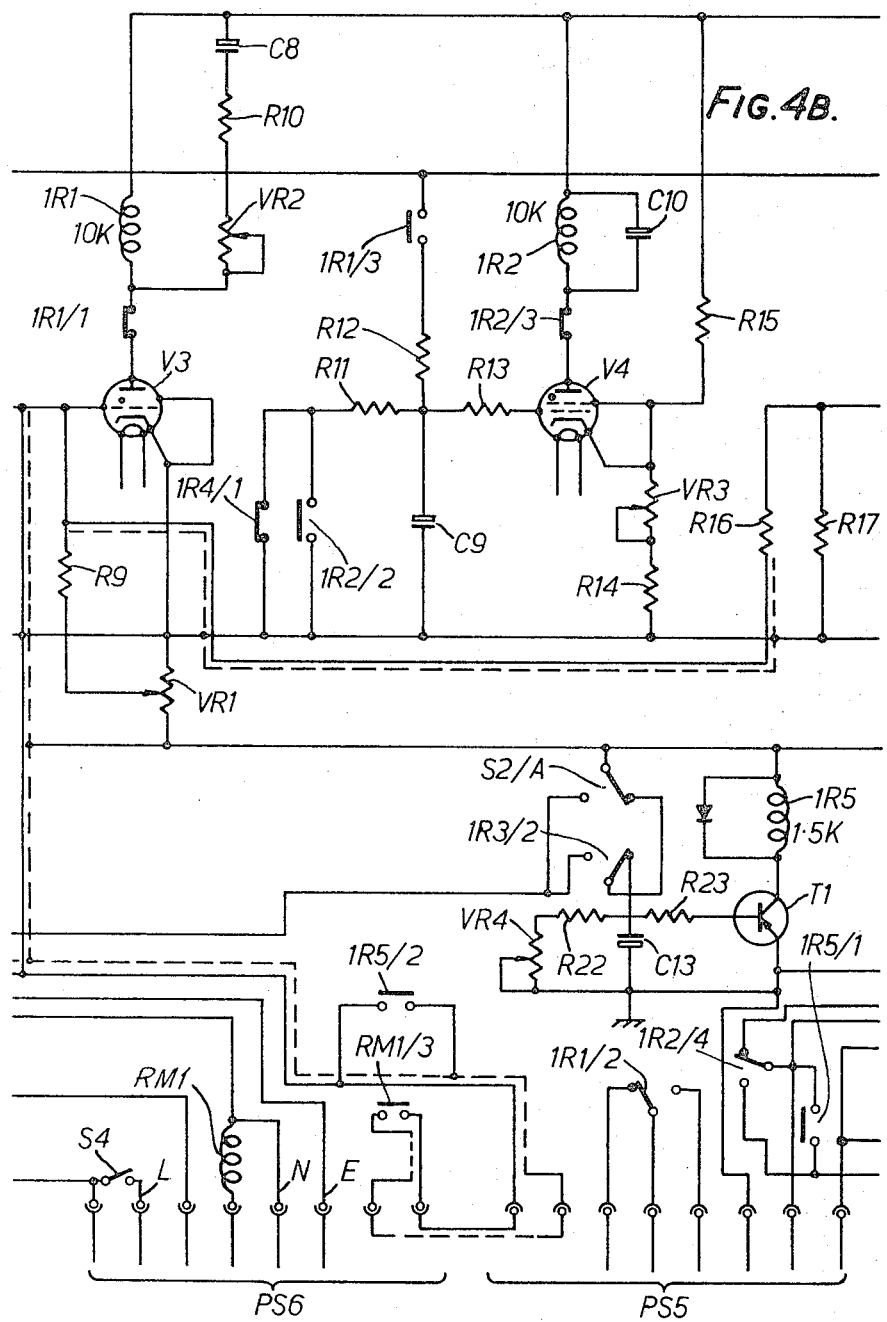

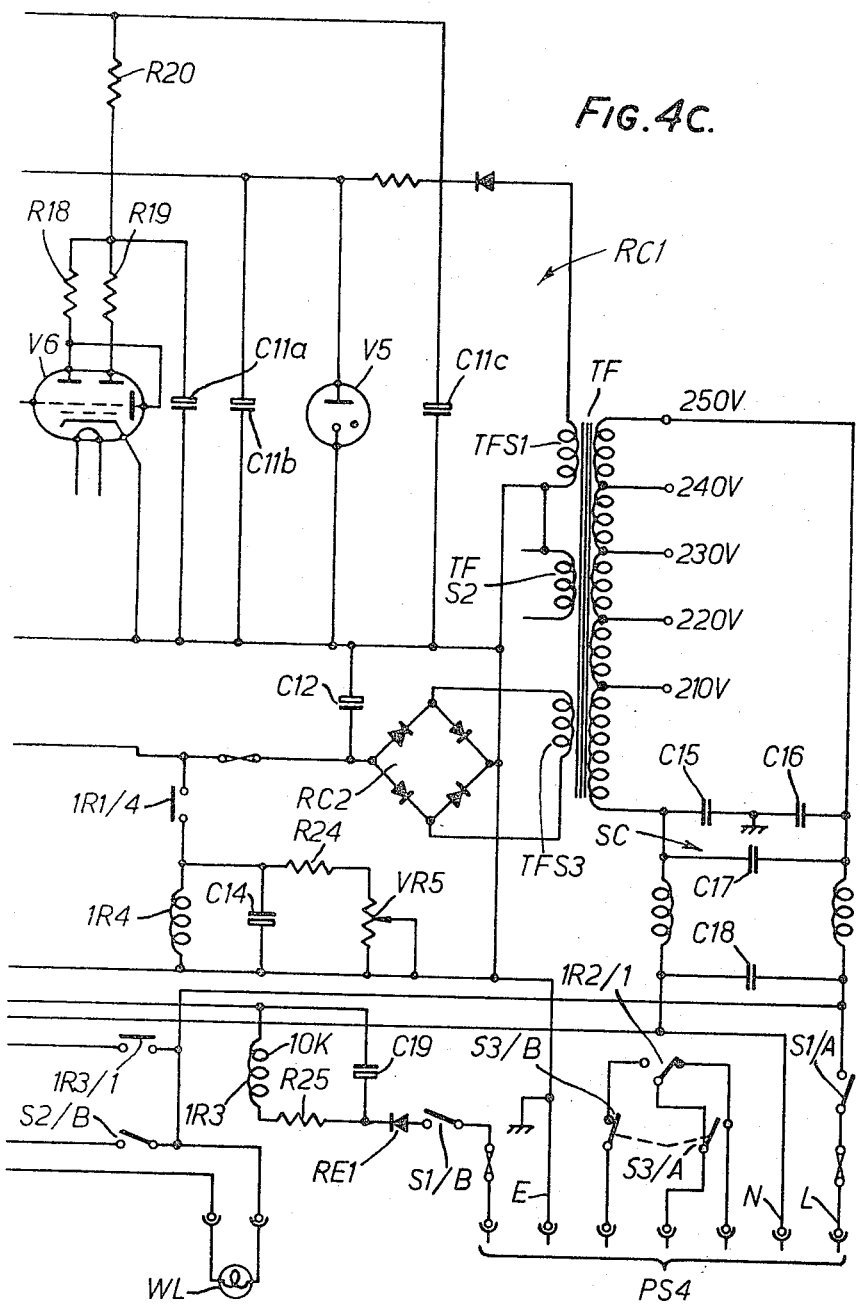

United States Patent Office 3,308,658
Patented Mar. 14, 1967

3,308,658
DEVICES FOR DETECTING FLAWS
IN FABRICS
Leonard Thomas Frank Bryan, Northrepps, Stanley Hill,
Amersham, England
Filed Mar. 10, 1964, Ser. No. 350,744
Claims priority, application Great Britain, Mar. 12, 1963,
9,831/63
10 Claims. (Cl. 73—159)

This invention concerns apparatus for detecting flaws in fabrics and of the type wherein flaw detector means is continuously traversed to and fro across the width of a moving web of fabric to scan the fabric for flaws, the detector means being sensitive to variations in light passing through, or reflected from, the fabric and being actuated by a change of light resulting from a flaw in the fabric to effect an alarm (visual and/or audible) and/or to stop the fabric motion. Such apparatus is hereinafter referred to as of the type defined.

Such apparatus is in particular though not exclusively used for detecting flaws in textile fabrics as they are being produced, especially with a knitted fabric moving away from a fabrication line of a warp knitting machine to alarm or stop the machine on detection of a broken thread producing a ladder or run.

In certain circumstances the detector may be actuated when there is not a flaw, or the flaw is not so significant as to require stoppage of the machine, e.g. an oil mark as opposed to a broken thread. Also, if the detector is made highly sensitive as is basically desirable, it tends to give false alarms either by such insignificant flaws or by interference from voltage fluctuations, vibrations and temperature changes.

An object of the invention is to provide apparatus wherein such disadvantages of incorrect detection are reduced or eliminated.

According to the inevntion there is provided apparatus for detecting flaws in fabrics and of the type defined characterised in that actuation of the flaw detector means is arranged to operate control means to reverse the direction of traverse of the detector means in such manner that upon each actuation of the detector means the flaw region is re-scanned by the detector means, and to effect the alarm and/or stop the fabric motion only when the detector means has scanned and detected the flaw a predetermined number of times. In this way the sensitivity of the apparatus in detecting flaws may be selected to be of a very high order while ensuring that the alarm will be given when there is great certainty that a genuine flaw exists.

Advantageously the length of traverse of the detector means between such reversals is controlled to be relatively short and is so selected that the total time occupied in performing said predetermined number of scans is relatively small.

Preferably the control means operated upon each actuation of the detector means acts automatically to reverse temporarily the direction of traverse to return the detector means back beyond the flaw, render the detector means blind during such reversal, and restore the original direction of traverse to re-scan the flaw region with the detector means again rendered operative.

Suitably the detector means is arranged to be traversed fully across the width of the fabric by an electric reversing motor, limit switches automatically reverse the direction of traverse at the ends of such full traverse, and the control means operated upon each flaw actuation of the detector means overrides such limit switches to effect reversal of the direction of traverse.

According to a feature of the invention the apparatus includes electronic means to count the number of actuations of the detector means at any one flaw and effect the alarm and/or the fabric stop motion after the predetermined number of such actuations.

Figure 2:
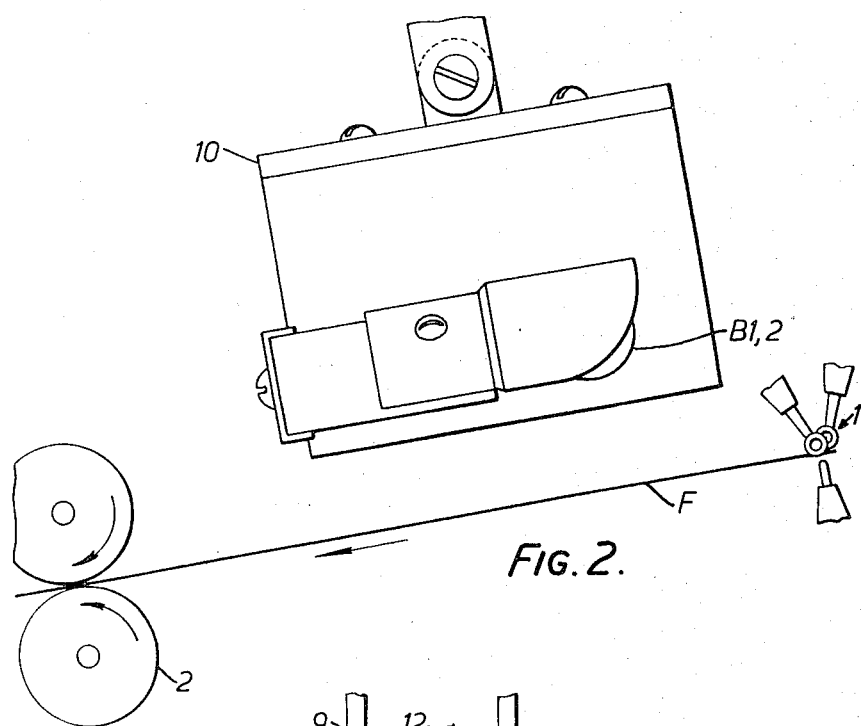
Figure 3:
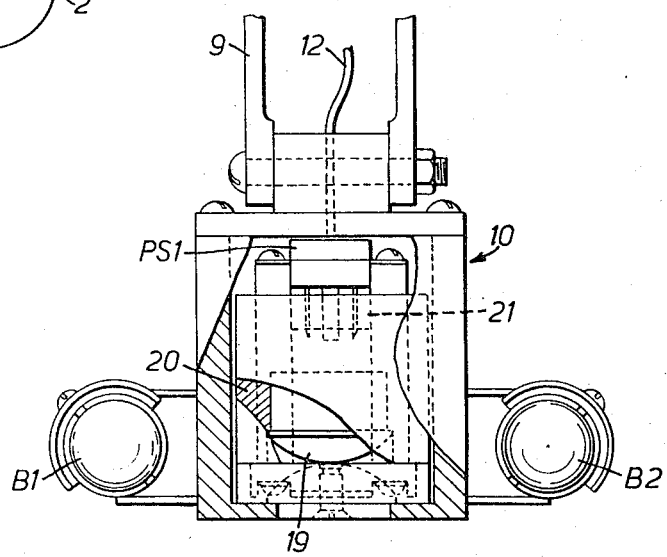
Figure 4A:
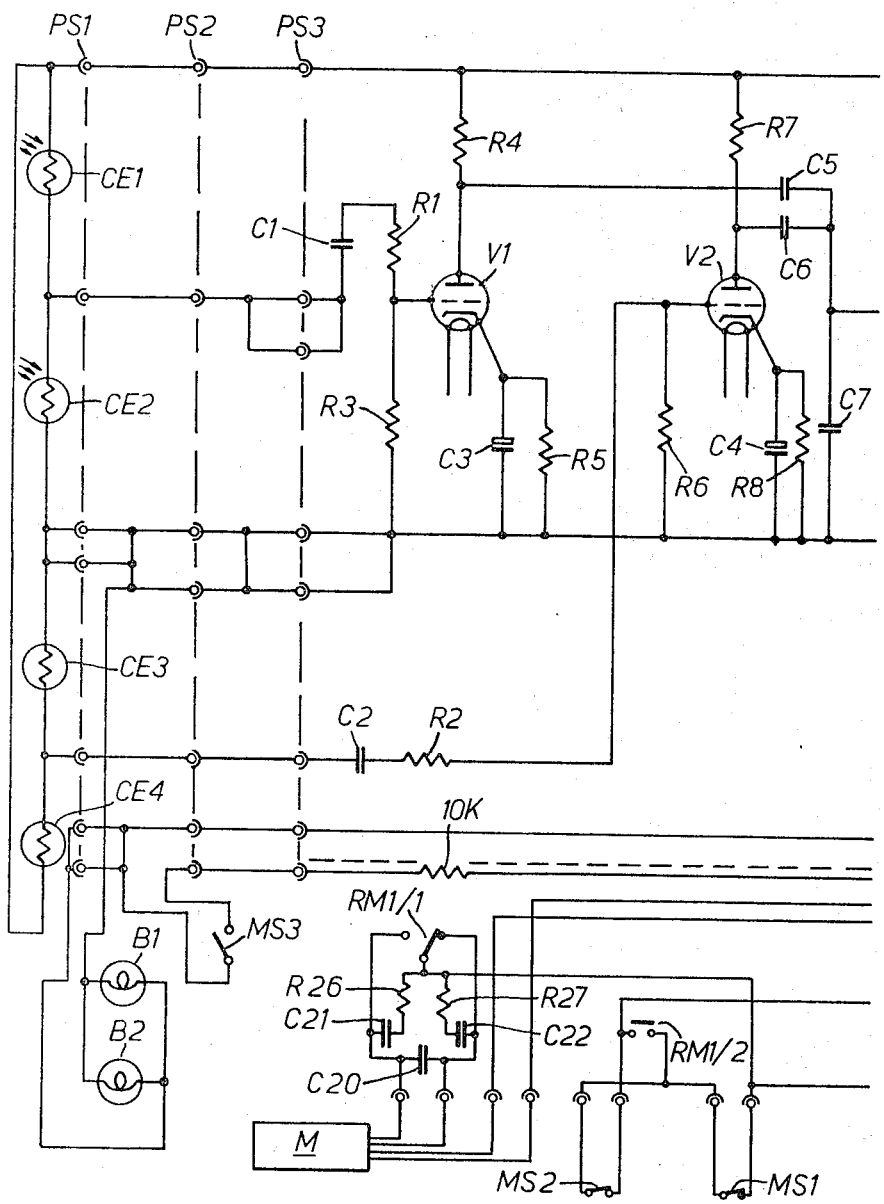

An embodiment of an apparatus according to the invention is hereinafter described by way of example with reference to the accompanying drawings in which:

FIG. 1 is a general view of the whole apparatus including the mounting for the traversing detector head, FIG. 2 is a side elevation of the detector head relative to a scanned fabric moving away from a fabrication line towards a pair of guide rolls, FIG. 3 is an end elevation of the detector head partly in section, and FIG. 4 A, B, C, is a circuit diagram of the apparatus, The apparatus will be described as applied for flaw detection to a warp knitting machine with a line 1 of knitting elements, the fabric F being drawn away from the line 1 by way of guide rolls 2.

The apparatus comprises columns 3 to stand, or possibly be otherwise located, one at each side of the machine and carrying between them a rail 4 along which a carriage 5 is reciprocably driven by an electric reversing motor M through an endless cord system 7 guided on pulleys 8. The carriage 5 is fixed in one of the two runs of the cord adjacent the rail 4; the other run of cord may run through the rail 4 which is hollow. A telescopic arm 9 depends from the carriage and carries at its lower end the detector head 10. An electric cable 11, 12 runs, on support means 13 between the columns and above the rail, from the head through the arm 9 to a control unit 14A, 14B via plug and socket connections PS1 on the head, PS2 on the carriage, and PS3 at the control unit. The control unit and the motor are both secured for height adjustment on one of the columns 3 and an alarm means, e.g. a warning lamp WL, is mounted on top of that column. The rail 4 and cable support means 13 are also adjustable as to height on the columns. Limit micro-switches MS1, MS2 are adjustably secured one towards each end on the rail 4 to be actuated by trigger members 17 on the carriage 5 as later explained.

The carriage 5 runs on the rail 4 by way of a plurality of rollers 18 co-acting with the rail, of rectangular section, to hold the detector arm 9 steady relative to the rail. The telescoping movement of the detector arm is adjustable and facilitates setting up and access to the fabric e.g. to attend to a fault.

The detector head 10 carries in appropriate holders two electric light emitting bulbs B1, B2 and a lens 19. A lens tube 20 extends up to a photo-electric cell block 21 of four cells CE1, CE2, CE3, CE4 containing germanium, cadmium selenide or other suitable material.

The detector head may be positioned very close to the fabrication line to give very early indication of a flaw in the fabric. The head is set up so that the bulbs illuminate the fabric below, and the photo-cells send a signal to the control unit when they detect any flaw, e.g. an oil mark or a broken thread producing a ladder or run, by sensing variation of the light reflected from the fabric.

Such actuation of the detector due to an oil mark or other reason e.g. due to high sensitivity as mentioned above, and other than due to a broken thread, may not be desired to effect the alarm and/or the stop motion of the machine which are connected as responder means to the control circuit. The control unit incorporates means operated upon each actuation of the detector to reverse temporarily the direction of traverse to return the detector back beyond the flaw, render the detector blind during such reversal, and restore the original direction of traverse to re-scan the flaw region with the detector again rendered operative. This sequence is automatically repeated for any flaw up to a predetermined number of times, e.g. an adjustable number counting from one to ten times, and then if the flaw continues to be detected, the alarm and/or machine stop motion is effected.

In the electrical control circuit, the photo-electric cells are in two sets and feed flaw detection signals into two triode amplifying valves V1, V2 arranged in a mixing circuit and the common output is fed to the control grid of a thyratron V3. The output from the thyratron V3 energizes a pulse relay coil IR1; a cut-off contact IR1/1 of this relay is in series with the relay coil and as soon as energized this contact opens, causing the thyratron V3 to cut off. However, the relay coil does not immediately de-energise, being maintained by the condenser C8. This time cycle is adjustable via resistor R10 and variable resistor VR2. A reversing contact IR1/2 is in the circuit of the motor M and overrides the limit microswitches MS1, MS2 to reverse the motor M and effect a reciprocating movement of the detector head back beyond the detected flaw. The reversing period and length is adjustable by the variable resistor VR2 as aforesaid. A pulse contact IR1/3 is in the supply line to a count condenser C9 and pulse charges it, this condenser being in the control circuit of a second thyratron V4. During each successive reciprocation a count hold-on contact IR1/4 closes keeping condenser C14 and a count hold-on relay coil IR4 energised. The voltage at condenser C14 is adjustable by a variable resistor VR5, acting as a pre-set count control.

Relay IR4 whilst energised maintains its contact IR4/1 open in parallel with condenser C9

Should the flaw clear after a number of reciprocations below a predetermined number e.g. in the case of an oil mark, the detector head will continue on its normal traverse. Relay IR4 will eventually de-energise due to the discharge of condenser C14. The count cancel contact IR4/1 will close de-energising condenser C9 via resistor R11 thereby cancelling the stored detection signal pulse count.

If however the flaw does not clear, e.g. in the case of a broken thread, then the detector head will continue to reciprocate over it and contact IR1/3 will continue to supply pulses to condenser C9. When condenser C9 has been charged up to a predetermined voltage, adjustable by variable resistor VR3 as a manual count control, the thyratron V4 will fire, energising a stop relay coil IR2. A cut-off contact IR2/3 of such relay in series with the relay coil opens, extinguishing the thyratron V4. Condenser C10 is charged and maintains this relay coil IR2 energised for a period of time. A stop motion contact IR2/1 is a change-over contact actuated in the stop motion circuit of the knitting machine, to stop the machine. A count cancel contact IR2/2 closes, de-energising condenser C9 and readying for the next counting period. Contact IR2/4 in the supply to the alarm or warning lamp WL is actuated to energise same. When the machine stops the supply to a machine relay coil IR3 via a rectifier RE1 is cut off. A detector stop contact IR3/1 of such relay opens removing the supply to the detector head drive motor M, causing the detector head to come to rest. A timer contact IR3/2 changes to its normal position applying negative voltage to a condenser C13 and also to the base of a transistor T1, and this transistor conducts thus energising a timer relay coil IR5. An alarm contact IR5/1 of such relay closes in the supply to the alarm or warning lamp WL to maintain the same energised. A blinding contact IR5/2 closes to short circuit the control grid of the thyratron V3 and render the detector blind.

The two limit micro-switches MS1, MS2 reverse the motor M, and thus the direction of traverse of the detector head, when actuated by the detector carriage trigger members 17 at the end of each full traverse. Switch MS1 is normally open and switch MS2 is normally closed; actuation of these switches in turn energising and de-energising the coil of a relay RM1. Contact RM1/1 of such relay is in the alternating current supply to the motor and acts as a reversing switch to change the motor direction at each actuation of the switches MS1, MS2. Contact RM1/2 is in parallel with the normally open switch MS1 and closes to hold the relay coil energised during traverse in one direction. Contact RM1/3 closes on energisation of the relay coil to short circuit the grid of the thyratron V3 and render the detector blind during its traverse in said one direction; this contact is in parallel with the contact IR5/2.

When the machine is started, or re-started after repairing a flaw, relay coil IR3 is energised. Contact IR3/1 closes in the detector motor circuit and the detector head begins to traverse the fabric. Contact IR3/2 changes to its energised position to energise the light bulbs B1, B2 and to remove the supply from condenser C13. Condenser C13 now discharges through the base of the transistor T1 keeping it conducting, and also leaks away through the resistor R22 and variable resistor VR4. The latter is an adjustable control providing an adjustable delay to allow a repaired flaw to pass clear of the scan path. As the condenser C13 becomes discharged the transistor T1 cuts off thus de-energising relay coil IR5. Contact IR5/1 of such relay opens to extinguish the warning lamp WL, and contact IR5/2 opens to remove the short circuit from the grid of the thyratron V3 and render the detector operative to see flaws, after the adjustable delay controlled by the variable resistor VR4.

Other manual controls include a mains supply ON/OFF switch S1, a TEST RUN/AUTO switch S2, and a machine stop motion switch S3. The switch S1 comprises ganged contacts S1/A, S1/B. The switch S3 can render the machine stop motion circuit inoperative, but the warning lamp WL will be energised when the maximum set detection count has been achieved over any one flaw. The switch S3 comprises ganged contacts S3/A, S3/B. The switch S2 sets the apparatus to run automatically with the knitting machine, but can be alternatively set to run the detector independently of the machine for test running; the switch comprises ganged contacts S2/A, S2/B.

A manual sensitivity control is provided by a variable resistor VR1 in the control grid circuit of the first thyratron V3. A high sensitivity is allowable with the apparatus as mentioned above.

The manual count control VR3 is graduated to count the number of times any one flaw is detected, with a minimum count of 1 and a maximum count of 10. With the control set to the minimum count, the detector head can pass over the flaw once and then effects the alarm and/or machine stop motion. If set to any number from 2 to 10, the detector head will reverse back beyond the flaw and re-scan the flaw such predetermined number of times and then effects the alarm and/or stop motion.

Valve V6 is a visual signal level indicator, to indicate the general signal noise level of the fabric as the detector head traverses and distinguish such noise from a flaw. This indicator also gives visual indication that the detector is blind in the one direction of traverse as explained above. In the blind direction of traverse the grid of valve V3 is short circuited by a cut-out micro-switch MS3 mounted on the detector carriage and arranged to be actuated automatically by fixed trigger members (not shown) at each end of the traverse.

The circuit diagram also shows a manual detector motor ON/OFF switch S4 in the motor supply circuit.

Power is supplied via a mains socket PS4 which also carries the machine stop motion circuit. Lines L, N and E are live, neutral and earth. The supply includes a smoothing circuit SC to the primary of transformer TF. The transformer secondary windings TFS1, TFS2, TFS3 provide respectively the valve anode supply, via a rectifying circuit RC1 in conjunction with stabilizer tube V5, the valve heater supply, and the transistor supply via rectifier circuit RC2.

Plug sockets PS5, PS6 connect the main control unit 14A and the motor box control unit 14B.

The circuit components may have the following ratings e.g.—

RESISTORS (OHMS)

| | | | |
|---|---|---|---|
| R1 | 220K | R15 | 10K, 10 Watts |
| R2 | 220K | R16 | 1M |
| R3 | 1M | R17 | 2M |
| R4 | 15K | R18 | 470K |
| R5 | 180 | R19 | 10K |
| R6 | 1M | R20 | 10K |
| R7 | 15K | R21 | 5K, 10 Watts |
| R8 | 18 | R22 | 1.5K |
| R9 | 2M | R23 | 33K |
| R10 | 350 | R24 | 1K |
| R11 | 25 | R25 | 15K, 10 Watts |
| R12 | 1M | R26 | 25 |
| R13 | 1K | R27 | 25 |
| R14 | 350 | | |

CAPACITORS (MICROFARADS)

| | | | |
|---|---|---|---|
| C1 | .01 micro | C11c | 32 |
| C2 | .01 micro | C12 | 5000 |
| C3 | 8 | C13 | 500 |
| C4 | 8 | C14 | 500 |
| C5 | .01 micro | C15 | .1 |
| C6 | .01 micro | C16 | .1 |
| C7 | .01 micro | C17 | .1 |
| C8 | 32+16 | C18 | .1 |
| C9 | 8 | C19 | 2 |
| C10 | 8 | C20 | 1 |
| C11a | 16 | C21, 22 | .1 |
| C11b | 32 | | |

VARIABLE RESISTORS (OHMS)

| | | | |
|---|---|---|---|
| VR1 | 500 | VR4 | 25K |
| VR2 | 1K | VR5 | 25K |
| VR3 | 5K | | |

I claim:

1. Apparatus for detecting flaws in fabrics comprising photo-electric flaw detector means, drive means to traverse said detector means continuously to and fro across the width of a moving web of fabric to scan the fabric for flaws, said detector means being sensitive to variations in light received from the fabric so as to be actuated by a change of light resulting from a flaw in the fabric and, upon detection of such flaw, providing a flaw signal, and electronic control means instantly responsive to said flaw signal to cause immediate reversal of the direction of traverse of said detector means to re-scan the flaw region means counting said flaw signals; and responder means to effect an alarm upon said counting means counting a predetermined and adjustable number of flaw signals.

2. Apparatus according to claim 1 wherein said control means comprises electronic means to count the number of actuations of said control means at any one flaw and activate the responder means after the predetermined number of such actuations, and means to adjust the predetermined number of such actuations necessary to activate the responder means.

3. Apparatus according to claim 2 wherein said control means includes means to automatically re-set said counting means to zero when said detector means fails to actuate said control means the predetermined number of times.

4. Apparatus according to claim 1 wherein said control means includes means to adjust the period of the reverse traverse so that the length of traverse of said detector means between such reversals is relatively short and the total time occupied in performing said predetermined number of scans is relatively small.

5. Apparatus according to claim 1, wherein said control means controls said drive means to reverse the direction of traverse and the distance of reversed traverse, said distance being predetermined and limited to be substantially less than the width of the fabric; and further controls said drive means to restore the original direction of traverse to rescan the flaw region.

6. Apparatus according to claim 1 wherein said drive means comprises an electric reversing motor, limit switches automatically reverse the direction of traverse at the end of each full traverse across the width of the fabric, and said control means upon actuation overrides said limit switches to effect reversal of the direction of traverse.

7. Apparatus according to claim 1 wherein said control means comprises a first thyratron arranged to receive detection signals from the photo-sensitive means, to provide an output, a pulse relay energised by such output and comprising a cut-off contact, a reversing contact, a pulse contact and a count hold-on contact, a second thyratron, a count condenser in the control circuit of said second thyratron, and a count hold-on relay, and said cut-off contact is in series with said pulse relay coil to open as soon as energised and cut off said first thyratron, a condenser/resistor circuit being adjustable to control the de-energising period of such coil, said reversing contact is in the circuit of an electric reversing motor comprised in the detector drive means to reverse the direction of traverse, said pulse contact is in a supply line to said count condenser, and said count hold-on contact keeps said count hold-on relay energised.

8. Apparatus according to claim 7 wherein if the flaw clears after a number of scans below the predetermined number, the count hold-on relay is arranged to de-energise due to discharge of a condenser and close a count cancel contact to de-energise the count condenser and thereby cancel the stored detection signal pulse count.

9. Apparatus according to claim 7 wherein if the flaw does not clear by the predetermined number of scans the count condenser is arranged to have charged up to a predetermined voltage, which is adjustable as a count control to fire the second thyratron and thus energise a stop relay which comprises a cut-off contact to extinguish such thyratron, a condenser controlling the relay coil de-energising period, a stop motion contact being a change-over contact in a fabric stop motion circuit, and a count cancel contact to de-energise the count condenser.

10. Apparatus according to claim 1 wherein said responder means effecting an alarm is further connected to stop motion of said fabric.

References Cited by the Examiner
UNITED STATES PATENTS 2,919,624 1/1960 Lindemann et al. __ 250—219 X
3,116,621 1/1964 Klein et al. _____ 250—219 X DAVID SCHONBERG, *Primary Examiner.*